July 14, 1970 A. E. REVELL ET AL 3,520,111

GAS FILTER APPARATUS

Filed Nov. 5, 1968

INVENTORS
Alan E. Revell
Wilson A. Welch
BY
Ralph B. Brick

3,520,111
GAS FILTER APPARATUS

Alan E. Revell and Wilson A. Welch, Louisville, Ky., assignors to American Air Filter Company, Inc., Louisville, Ky., a corporation of Delaware
Filed Nov. 5, 1968, Ser. No. 773,442
Int. Cl. B03c *3/08*
U.S. Cl. 55—143          2 Claims

ABSTRACT OF THE DISCLOSURE

An improved mounting device for gas filter apparatus of the plate electrode assembly type wherein the plate electrode assembly is provided with longitudinally extending skids mounted in spaced opposed relation along the upstream and downstream faces thereof to extend transverse the gas stream to be treated, the skids engaging with spaced opposed track members mounted within and along the upstream and downstream sides of a flow-through housing for the plate electrode assembly, the side of the plate electrode assembly having a cantilevered seal member extending therefrom to overlap in sealed relation with the adjacent side of a second plate electrode assembly disposed within the housing in side-by-side relation.

BACKGROUND OF THE INVENTION

The present invention relates to fluid filters and finds particular utility in the gas separation art where spaced, charged and grounded electrode plates are alternately arranged for electrostatically treating the gas stream to be cleaned.

In electrostatic gas filters, a gas stream to be treated passes through a housing having upstream and downstream openings. Filter assemblies comprised of parallel, spaced, charged and grounded electrode plates are disposed within the housing between the housing openings. The plates of each of the assemblies are arranged alternately to electrostatically treat the gas stream so that solid particles in the stream are deposited and held thereon, the plates often being coated with a suitable adhesive to enhance particle retention. At selected intervals, precipitating operations are interrupted so that deposits precipitated on the plates can be removed. Once this has been accomplished, precipitating operations are resumed effectively.

Various devices have been utilized in the past to mount the plate electrode assemblies in the housing. These devices have often been complex in construction and maintenance, and have frequently led to problems in plate misalignment with concomitant injury of plate edges as the assemblies are inserted and removed in the housing. In addition, problems of gas leakage have occurred when the plate electrode assemblies have been placed in side-by-side relationship in the flow-through housing.

In accordance with the present invention, a mounting arrangement for plate electrode assemblies is provided which avoids the abovementioned disadvantages and problems, the present invention providing an arrangement which is economical to construct and maintain, which requires a minimum of moving parts and hardware, which eliminates comparatively expensive bearing and wheel assemblies of the past, and which, at the same time, permits the rapid and positive insertion and removal of plate electrode assemblies with a minimum of injury to the plate edges of such assemblies and with a minimum of gas leakage.

Various other features of the present invention will become obvious to one skilled in the art upon reading the disclosure set forth herein.

More particularly, the present invention provides an electrostatic gas filter apparatus comprising: a flow-through housing having dirty gas upstream inlet means and clean gas downstream outlet means; spaced opposed longitudinally extending track members disposed within said housing to extend horizontally transverse the gas stream flow along the upstream and downstream sides thereof, respectively; and plate electrode assembly means including parallel, spaced, charged, and grounded electrode plates alternately arranged for electrostatically treating a gas stream, the plate electrode assembly means having spaced opposed longitudinally extending skid members mounted thereon to extend horizontally transverse the electrode plates along the upstream and downstream side thereof, the skid members on the plate electrode assembly engaging with the track members in the housing to provide support of the plate electrode assembly means during gas treating operations, and to allow aligned insertion and removal of the plate electrode assembly without scraping the upper and lower edges of the electrode plates.

In addition, the present invention provides a novel, flexible seal member mounted on the side of the plate electrode assembly to extend in cantilever fashion from one side thereof transverse the gas stream to be treated to overlap in sealing engagement with an immediately adjacent side of a plate electrode assembly mounted within the housing in side-by-side relationship.

It is to be understood that various changes can be made in the arrangement, form, and construction of the apparatus disclosed herein without departing from the scope or spirit of the present invention.

Referring to the drawing.

Figure 1:
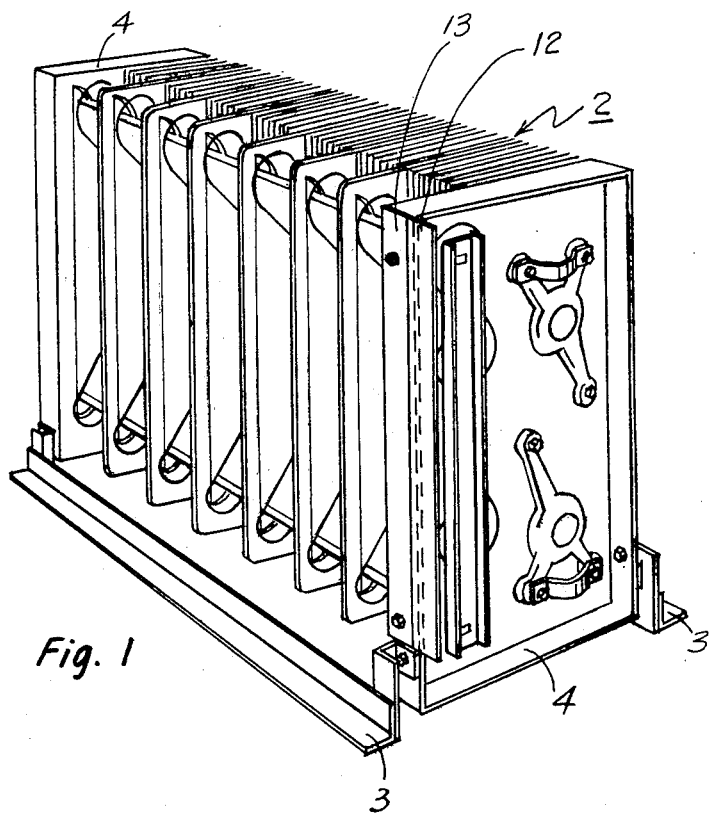
FIG. 1 is a perspective view of a plate electrode assembly incorporating the novel features of the present invention.

Referring to FIG. 1 of the drawing, a plate electrode assembly 2 is disclosed similar to that disclosed in assignee's U.S. Pat. No. 3,041,807, issued to A. R. Getzin et al., on July 3, 1962, wherein plate electrode assemblies are placed in side-by-side and stacked relationship. Plate electrode assembly 2 includes parallel, spaced and grounded electrode plates alternately arranged for electrostatically treating a gas stream.

Figure 3:
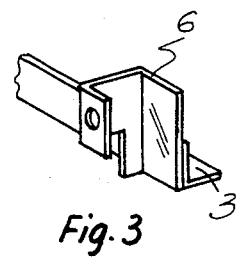
FIG. 3 is a detail of the mounting arrangement for the assembly of FIGS. 1 and 2.

In accordance with the present invention, plate electrode assembly 2 has disposed on the lower portion thereof longitudinally extending spaced opposed right angle skid members 3, the skid members being mounted to grounded side plates 4 of the plate electrode assembly to extend below the lower edges thereof by means of U-shaped bracket members 6 (FIG. 3), one leg of bracket member 6 being bolted to the grounded side plate 4 of the plate electrode assembly 2 and the other serving to receive in faced relationship thereof the extremity of one leg of right angle skid member 3. With this arrangement skid members 3 extend horizontally transverse the electrode plates of assembly 2 along the upstream and downstream sides of the plates.

Figure 2:
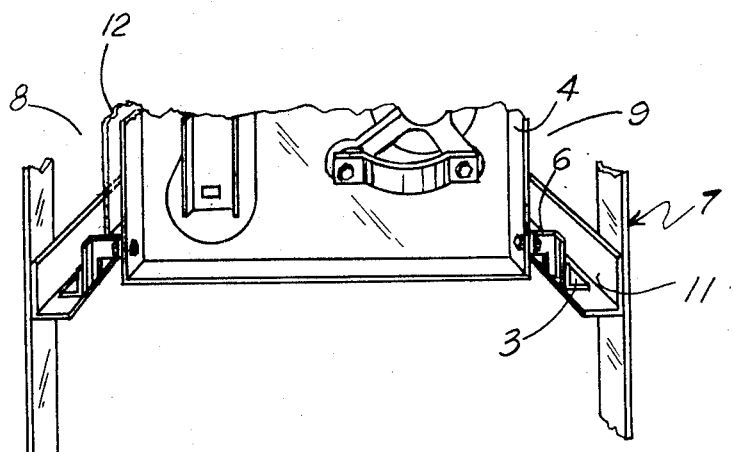
FIG. 2 is a side elevational view of a portion of the plate electrode assembly of FIG. 1 and the flow-through gas housing in which the assembly is mounted.

As can be seen in FIG. 2 of the drawings, flow-through housing 7 which includes upstream dirty gas inlet 8 and downstream clean gas outlet 9 is provided with spaced, opposed, longitudinally-extending right angle track members 11 which are disposed within the housing to extend horizontally transverse the gas stream flow along the upstream and downstream sides thereof, respectively. These track members serve to receive skid members 3 mounted on the plate electrode assemblies to provide bottom support therefor, the track members being fastened to housing 7 at their extremities by some suitable means such as welding. It is to be understood that housing 7 is provided with a suitable side inlet to permit insertion of the plate electrode assemblies 2. It also is to be understood that, if desired, suitable skid members can also be provided along the upper portions of the plate electrode assemblies to engage with track members appropriately positioned on housing 7, the engagement of the skid and track members in either event serving to prevent tilting or canting of the plate electrode assemblies during insertion and removal so as to avoid any damage to the upper and lower edges of the electrode plates.

As can be seen in FIG. 1 of the drawing, a flexible seal member 12 can be mounted on the grounded side plate 4 of plate electrode assembly 2 by means of a stud and fastening bar assembly 13. Flexible seal 12 is positioned in cantilever fashion to engage in overlapping relation with an adjacent side of a second plate electrode assembly which might be inserted into housing 7 in side-by-side relationship with plate electrode assembly 2. Thus, the gas stream being treated is prevented from flowing intermediate the plate electrode assemblies.

The invention claimed is:

1. An electrostatic gas filter apparatus comprising: a flow-through housing having dirty gas upstream inlet means defining a gas flow path therebetween and clean gas downstream outlet means, said housing having a side access opening in a side thereof intermediate said inlet and said outlet; spaced apart from one another opposed to one another longitudinally extending substantially parallel to one another, track members disposed within said housing in communication with said side opening and extending horizontally transverse said gas stream flow path; and plate electrode assembly means including a plurality of plate electrode assemblies, each plate electrode assembly including parallel to one another spaced apart from one another, charged and grounded electrode plates alternately arranged for electrostatically treating a gas stream flowing in said flow path, a pair of grounded side plate members disposed at the opposite extremities of said plate electrode assembly, bracket members mounted to the lower portions of each of said side plate members, said bracket members extending respectively outwardly in upstream fashion and in downstream fashion from said side plate members, spaced opposed longitudinally extending skid members mounted at opposite ends on said bracket members and extending horizontally transverse the electrode plates along respectively the upstream and downstream side of said plate electrode plates, said skid members engaging with said track members in said housing and supporting said plate electrode assemblies in side-by-side stacked position during gas treating operation, and allowing aligned insertion and removal of said plate electrode assemblies through said side opening without scraping of the upper and lower edges of said electrode plates.

2. The apparatus of claim 1, each plate electrode assembly having a flexible seal member mounted thereon to extend in cantilever fashion from one side thereof transverse said gas flow path to overlap in sealing engagement with an immediately adjacent side of a plate electrode assembly mounted within said housing in side-by-side relation thereto.

References Cited

UNITED STATES PATENTS

| | | | |
|---|---|---|---|
| 2,380,992 | 8/1945 | Pegg et al. | 55—118 |
| 2,486,521 | 11/1949 | Dahlman | 55—138 |
| 2,662,608 | 12/1953 | Fields | 55—138 X |
| 2,780,305 | 2/1957 | Bonatz | 55—118 X |
| 2,555,125 | 5/1951 | Gregory | 55—440 |
| 3,028,715 | 4/1962 | Nodolf | 55—138 |
| 3,173,774 | 3/1965 | Getzin | 55—138 X |
| 3,237,383 | 3/1966 | Gilbertson | 55—139 |
| 3,271,932 | 9/1966 | Newell | 55—152 X |
| 3,392,509 | 7/1966 | Pelosi | 55—481 X |
| 3,438,180 | 4/1969 | Klovda | 55—131 |

DENNIS E. TALBERT, JR., Primary Examiner

U.S. Cl. X.R.

55—145, 149, 156, 481